United States Patent
Park

(10) Patent No.: US 7,188,952 B2
(45) Date of Patent: Mar. 13, 2007

(54) MICRO DISPLAY PROJECTION SYSTEM

(75) Inventor: Jong Myoung Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 155 days.

(21) Appl. No.: 10/995,526

(22) Filed: Nov. 24, 2004

(65) Prior Publication Data

US 2005/0117120 A1    Jun. 2, 2005

(30) Foreign Application Priority Data

Nov. 27, 2003    (KR)    ............ 10-2003-0084945

(51) Int. Cl.
G03B 21/14    (2006.01)
G03B 21/26    (2006.01)
B03B 21/36    (2006.01)

(52) U.S. Cl. .................. 353/20; 353/30; 353/39
(58) Field of Classification Search ........ 353/20, 353/30, 31, 84, 99
See application file for complete search history.

(56) References Cited

U.S. PATENT DOCUMENTS

2002/0176146 A1*  11/2002  De Vaan .......... 359/242
2003/0016334 A1*   1/2003  Weber et al. ..... 353/20

* cited by examiner

*Primary Examiner*—Melissa Jan Koval
*Assistant Examiner*—Andrew Kong
(74) *Attorney, Agent, or Firm*—Fleshner & Kim LLP.

(57) ABSTRACT

Disclosed is a reflection-type micro display projection system having a polarization beam splitter with an optimized structure. The reflection-type micro display projection system includes a light source, an optical system, a reflection-type liquid crystal display panel, a projection lens, and a screen. When the incident angle of the light beam, which is output from an illumination lens of the optical system and input to a polarization beam splitter on the basis of the normal of the boundary face of the polarization beam splitter, is $\alpha$, the refractive angle of the light beam refracted inside the polarization beam splitter is $\beta$, and the refractive index of the polarization beam splitter is n, $n \times \sin \beta = \sin \alpha$. The refractive index n is larger than 1.6 and smaller than 2.0. The refractive angle $\beta$ is smaller than 75°.

5 Claims, 5 Drawing Sheets

MICRO DISPLAY PROJECTION SYSTEM

This Nonprovisional application claims priority under 35 U.S.C. § 119(a) on Patent Application No. 10-2003-0084945 filed in Korea on Nov. 27, 2003, the entire contents of which are hereby incorporated by reference.

BACKGROUND OF THE INVENTION

1. Field of the Invention

The present invention relates to a reflection-type micro display projection system. More particularly, the invention relates to a reflection-type micro display projection system having a polarization beam splitter with an optimized structure to increase optical efficiency and improve contrast of images.

2. Description of the Background Art

Recently, display systems have become light and thin while having a large screen. Particularly, a large-screen display system such as a projection TV system becomes important in the display field.

FIG. 1 shows the configuration of a conventional reflection-type micro display projection system. Referring to FIG. 1, the conventional reflection-type micro display projection system includes a lamp 1 emitting a light beam, an integrator 2 for changing the light beam emitted from the lamp such that the light beam has a uniform spatial distribution, a color wheel 3 for splitting the light beam output from the integrator 2 into time-sequential red, green and blue light beams, and first and second illumination lenses 4 for illuminating the split light beams to a reflection-type liquid crystal display panel 6. The system further includes a polarization beam splitter 5 for polarizing the light beams derived from the first and second illumination lenses 4, the reflection-type liquid crystal display panel 6 that reflects the polarized beams to output image information, a projection lens 7 for magnifying and projecting the image information, and a screen 8 for displaying an image corresponding to the image information magnified and projected by the projection lens 7.

The structure of the color wheel of the conventional reflection-type micro display projection system will now be explained in more detail.

FIG. 2 shows a filter structures of the color wheel. Referring to FIG. 2, the color wheel includes red, green and blue color filters 21, 22 and 23. The center of the color wheel is connected to a motor such that the color wheel is rotated. When the red filter 21 reaches the position of the integrator, the light beam of the color corresponding to the red wavelength band passes through the color wheel 3. The light beam of the color corresponding to the green wavelength band passes through the color wheel 3 when the green filter 22 is located at the position of the integrator. Furthermore, the light beam of the color corresponding to the blue wavelength band passes through the color wheel 3 when the blue filter 23 is located at the position of the integrator. In this manner, the light beams are time-sequentially arrived at the liquid crystal display panel. The light beams arrived at the liquid crystal display panel are transmitted or reflected in response to the type of the liquid crystal display panel to reach the projection lens. Then, the light beams pass through the projection lens to be imaged on the screen. While the light beam arrived at the liquid crystal display panel at an arbitrary moment is composed of one of red, green and blue beams, the beams arrived at the liquid crystal display panel can be recognized as a white beam when temporally summed up. The liquid crystal display panel can be divided into a single-panel type and a three-panel type based on the number of panels. Furthermore, the liquid crystal display panel can be divided into transmission-type and reflection-type liquid crystal display panels based on the method of converting light beams into image information.

In the meantime, the conserved quantity of light input to the reflection-type liquid crystal display panel in the conventional micro display projection system will now be explained with reference to FIG. 3. FIG. 3 is a diagram for explaining the operation of the polarization beam splitter used in the conventional reflection type micro display projection system. An f-number for defining the conserved quantity of light can be represented by Equation 1.

$$F/\# = 1/(2 \times \tan \alpha) \qquad \text{[Equation 1]}$$

Here, $\alpha$ represents an incident angle of the light beam output from the illumination lenses and input to the polarization beam splitter on the basis of the normal of the boundary face of the polarization beam splitter, and f-number is a value obtained by dividing the focal distance of the second illumination lens by its aperture. The Etendue that is the optical conserved physical quantity is represented using Equation 1 as follows.

$$\text{Etendue} = \pi \times S / (4 \times (F/\#)2) \qquad \text{[Equation 2]}$$

Here, S represents the area of the liquid crystal display panel and F# denotes the f-number of the illumination lens. The Etendue varies with the area of the liquid crystal display panel and the f-number of the illumination lens on a light path in the reflection-type micro display projection system. A variation in the Etendue in response to the area of the liquid crystal display panel and the f-number will now be explained in more detail with reference to FIGS. 4a and 4b.

FIGS. 4a and 4b are graphs showing variations in the Etendue in response to the area of the liquid crystal display panel and the f-number. Specifically, FIG. 4a is a graph showing a variation in the Etendue in response to the diagonal length of the liquid crystal display panel and FIG. 4b is a graph showing a variation in the Etendue in response to the f-number.

The area of the liquid crystal display panel can be represented by the diagonal length of the panel. Thus, the Etendue depends on the diagonal length of the panel as shown in FIG. 4a. Referring to FIG. 4a, the Etendue increases as the diagonal length of the liquid crystal display panel increases when the f-umber of the illumination lens is 3.0. Referring to FIG. 4b, the Etendue decreases as the f-number of the illumination lens increases when the diagonal length of the liquid crystal display panel is 0.8 inch. That is, the Etendue is decided by the area of the liquid crystal display panel and the f-number.

In the meantime, in the micro display projection system that is a large-screen display, the liquid crystal display panel is fabricated on a wafer through a semiconductor device fabrication method. Accordingly, if the size of the liquid crystal display panel is reduced, the number of liquid crystal display panels capable of being formed on a wafer having a specific area can be increased to improve productivity and decrease the manufacturing cost.

To reduce the cost of the liquid crystal display panel of the micro display projection system in consideration of this characteristic of the liquid crystal display panel fabrication process, it is preferable to decrease the size of the liquid crystal display panel while maintaining the number of pixels formed in the liquid crystal display panel in consideration of resolution of images. Consequently, the pixel size of the liquid crystal display panel should be reduced in order to reducing the size of the liquid crystal display panel while maintaining the number of pixels.

When the pixel size of the liquid crystal display panel is decreased, the aperture ratio is reduced to deteriorate optical efficiency of the projection system in the case of the transmission-type liquid crystal display panel. In the case of the reflection-type liquid crystal display panel, the aperture ratio is maintained. However, even when the aperture ratio is maintained using the reflection-type liquid crystal display panel, the reduced size of the liquid crystal display panel decreases the Etendue to deteriorate optical efficiency. To compensate the deteriorated optical efficiency, the f-number should be reduced. However, this increases the incident angle of light beam input to the polarization beam splitter and degrades the performance of the polarization beam splitter. Consequently, the contrast of the projection system is deteriorated.

SUMMARY OF THE INVENTION

Accordingly, an object of the present invention is to solve at least the problems and disadvantages of the background art.

It is an object of the present invention to provide a reflection-type micro display projection system with improved optical efficiency and contrast.

Another object of the present invention is to provide a polarization beam splitter having a high polarization ratio even with a small f-number.

Another object of the present invention is to provide a reflection-type micro display projection-system with improved optical efficiency, which employs a small-size reflection-type liquid crystal display panel to reduce the manufacturing cost.

To accomplish the above objects, according to the present invention, there is provided a reflection-type micro display projection system including a light source for emitting a light beam, an optical system for transmitting the light beam emitted from the light source, a reflection-type liquid crystal display panel for reflecting the light beam transmitted through the optical system and outputting the light beam as image information, a projection lens for magnifying and projecting the image information, and a screen for displaying an image corresponding to the image information magnified and projected by the projection lens.

When the incident angle of the light beam, which is output from an illumination lens of the optical system and input to a polarization beam splitter on the basis of the normal of the boundary face of the polarization beam splitter, is a, the refractive angle of the light beam refracted inside the polarization beam splitter is $\beta$, and the refractive index of the polarization beam splitter is n, $n \times \sin \beta = \sin \alpha$. The refractive index n is larger than 1.6 and smaller than 2.0.

The present invention can optimize the polarization ratio of the polarization beam splitter to improve the performance of the polarization beam splitter even at a small f-number. Furthermore, the present invention can improve the optical efficiency even with a small-size liquid crystal display panel by using the polarization beams splitter with improved performance. Accordingly, the cost of the reflection-type micro display projection system can be decreased while improving its performance.

BRIEF DESCRIPTION OF THE DRAWINGS

The invention will be described in detail with reference to the following drawings in which like numerals refer to like elements.

DETAILED DESCRIPTION OF PREFERRED EMBODIMENTS

Preferred embodiments of the present invention will be described in a more detailed manner with reference to the drawings.

A reflection-type micro display projection system according to the present invention includes a light source for emitting a light beam, an optical system for transmitting the light beam emitted from the light source, a reflection-type liquid crystal display panel for reflecting the light beam transmitted through the optical system and outputting the light beam as image information, a projection lens for magnifying and projecting the image information, and a screen for displaying an image corresponding to the image information magnified and projected by the projection lens.

When the incident angle of the light beam, which is output from an illumination lens of the optical system and input to a polarization beam splitter on the basis of the normal of the boundary face of the polarization beam splitter, is $\alpha$, the refractive angle of the light beam refracted inside the polarization beam splitter is $\beta$, and the refractive index of the polarization beam splitter is n, $n \times \sin \beta = \sin \alpha$. The refractive index n is larger than 1.6 and smaller than 2.0.

According to a preferred embodiment of the present invention, the optical system includes an integrator for changing the light beam such that the light beam has a uniform spatial distribution, a color filter for dividing the light beam output from the integrator into time-sequential red, green and blue beams, first and second illumination lenses for illuminating the divided beams to the liquid crystal display panel, and the polarization beam splitter for polarizing the beams derived from the first and second illumination lenses.

According to a preferred embodiment of the present invention, when the polarization beam splitter polarizes the light beam derived from the illumination lens, which has the property of wave, into an S-wave and a P-wave, at least one of the S-wave and P-wave is input to the liquid crystal display panel.

According to a preferred embodiment of the present invention, the refractive angle $\beta$ of the light beam refracted inside the polarization beam splitter is smaller than 7.5°.

According to a preferred embodiment of the present invention, the integrator includes at least one of a fly eye lens, a rod lens and a tunel.

According to a preferred embodiment of the present invention, the liquid crystal display panel is a single-panel type or a three-panel type.

Figure 1:
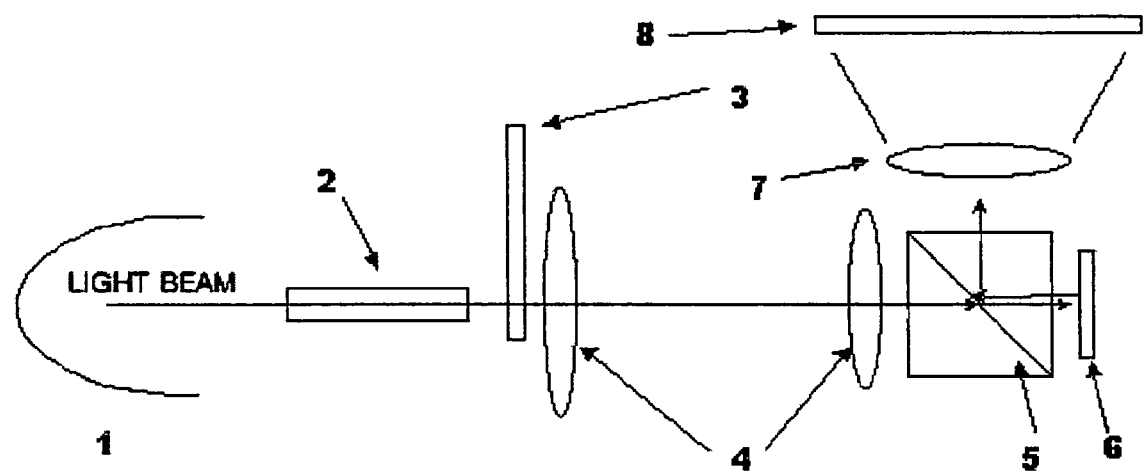
FIG. 1 shows the configuration of a conventional reflection-type micro display projection system.
Figure 2:
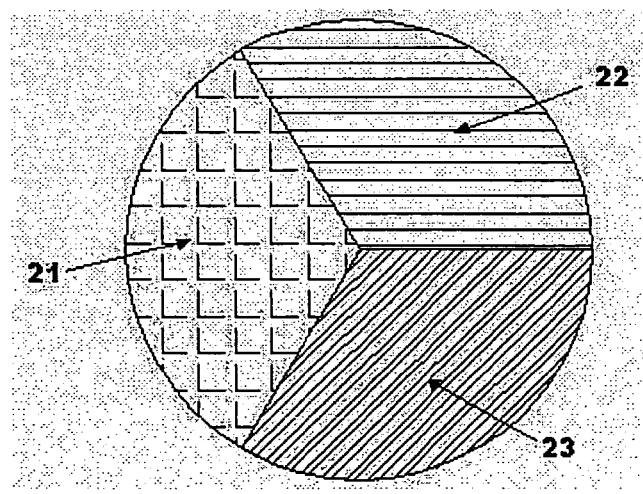
FIG. 2 shows a color wheel with a filter structure for dividing a color.
Figure 3:
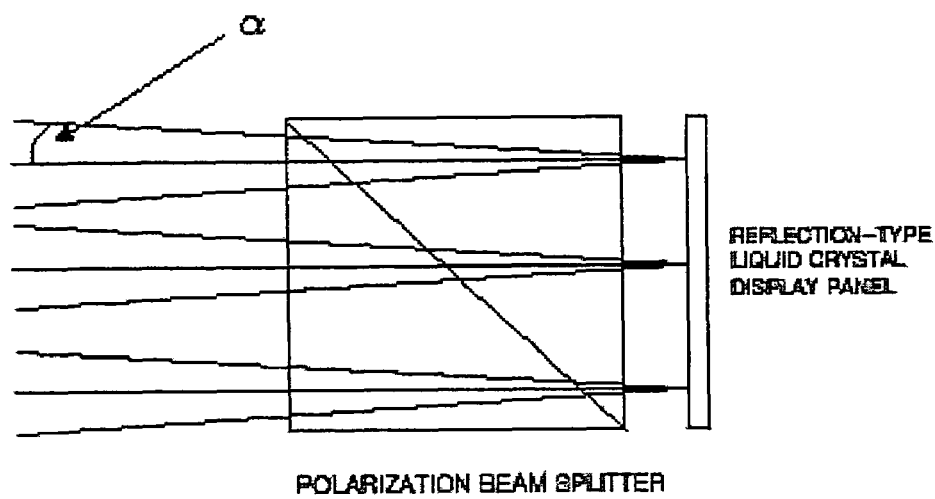
FIG. 3 is a diagram for explaining the operation of a polarization beam splitter used in the conventional reflection-type micro display projection system.
Figure 4A:
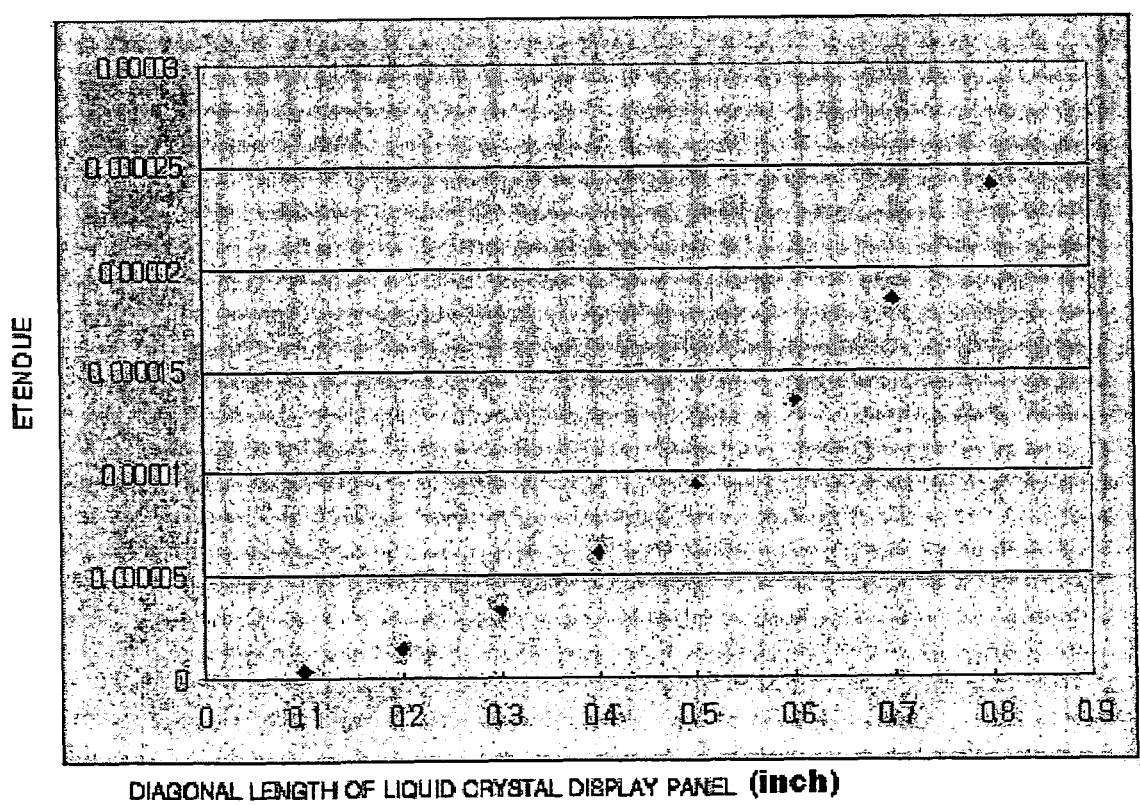
FIGS. 4a and 4b are graphs showing variations in the Etendue in response to the area of a liquid crystal display panel and f-number.
Figure 4B:
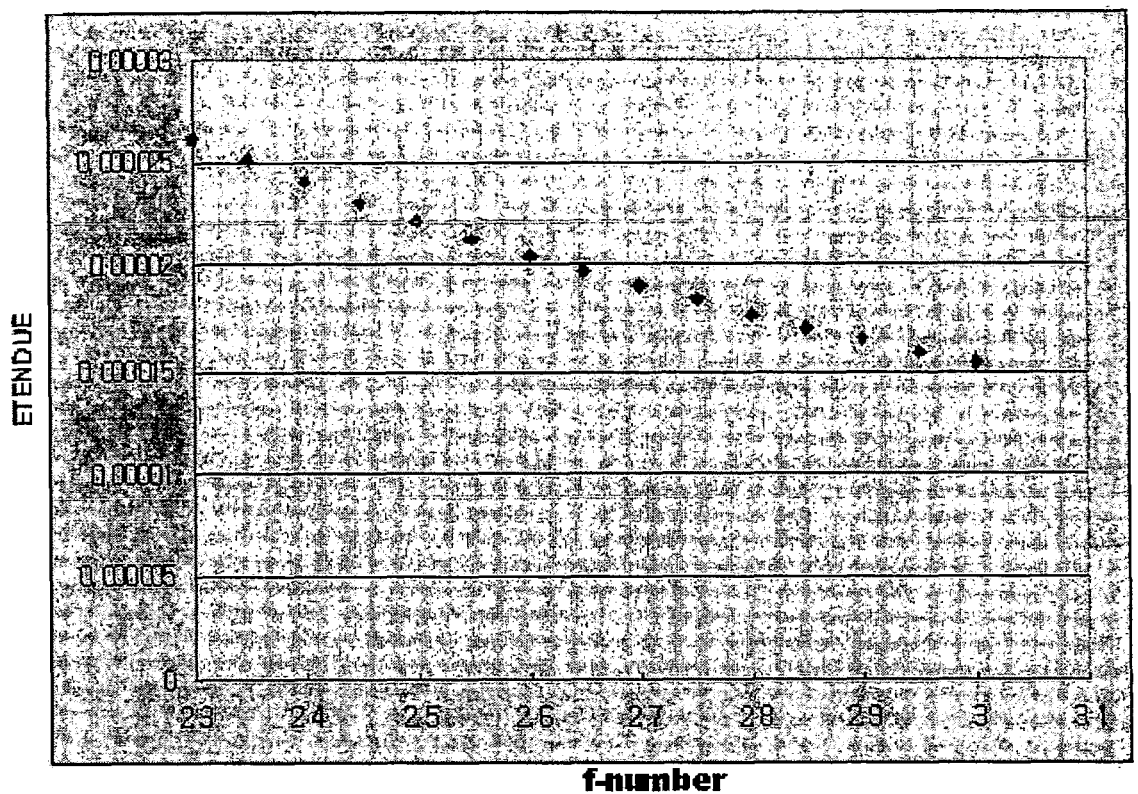
Figure 5:
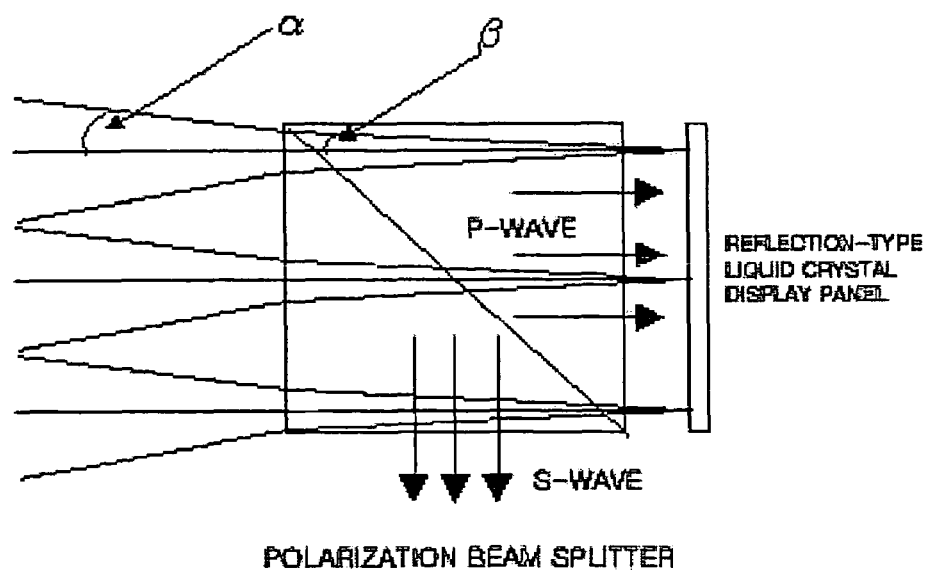
FIG. 5 is a diagram for explaining the operation of a polarization beam splitter according to the present invention.

FIG. 5 is a diagram for explaining the operation of the polarization beam splitter according to the present invention. Referring to FIG. 5, when the incident angle of the light beam, which is output from the illumination lens and input to the polarization beam splitter on the basis of the normal of the boundary face of the polarization beam splitter, is α and the refractive angle of the light beam refracted inside the polarization beam splitter is β, sin gα/sin gβ, which corresponds to the refractive index n of the polarization beam splitter, is constant according to the Snell s law. Accordingly, the refractive index β of the light beam can be obtained when the incident angle α is given and the refractive index n of the polarization beam splitter is controlled. The Snell s law defines that the ratio of the sine value of the incident angle of a light beam to the sine value of the refractive angle of the light beam is constant in the same medium.

In a preferred embodiment of the present invention, the refractive angle β of the light beam refracted inside the polarization beam splitter can be reduced to increase optical efficiency, thereby improving the performance of the polarization beam splitter.

A light beam has the property of wave and consists of P-wave for which the wave motion direction is identical to the vibration direction and S-wave for which the wave motion direction is perpendicular to the vibration direction. As shown in FIG. 5, the polarization beam splitter reflects S-wave of the light beam, which is input thereto from the illumination lens, at the internal inclined face thereof but transmits P-wave of the light beam to polarize the light beam derived from the illumination lens. Here, the micro display projection system selects one of S-wave and P-wave, which are output from the polarization beam splitter perpendicularly to each other, and uses the selected one.

In the reflection-type micro display projection system of the present invention, the polarization beam splitter transmits the P-wave. Accordingly, the contrast of the projection system can be improved by reducing transmissivity of the S-wave while increasing transmissivity of the P-wave. Variations in the transmissivities of the S-wave and P-wave in response to a variation in the refractive angle β of the light beam will now be explained in more detail with reference to FIGS. 6a and 6b.

Figure 6A:
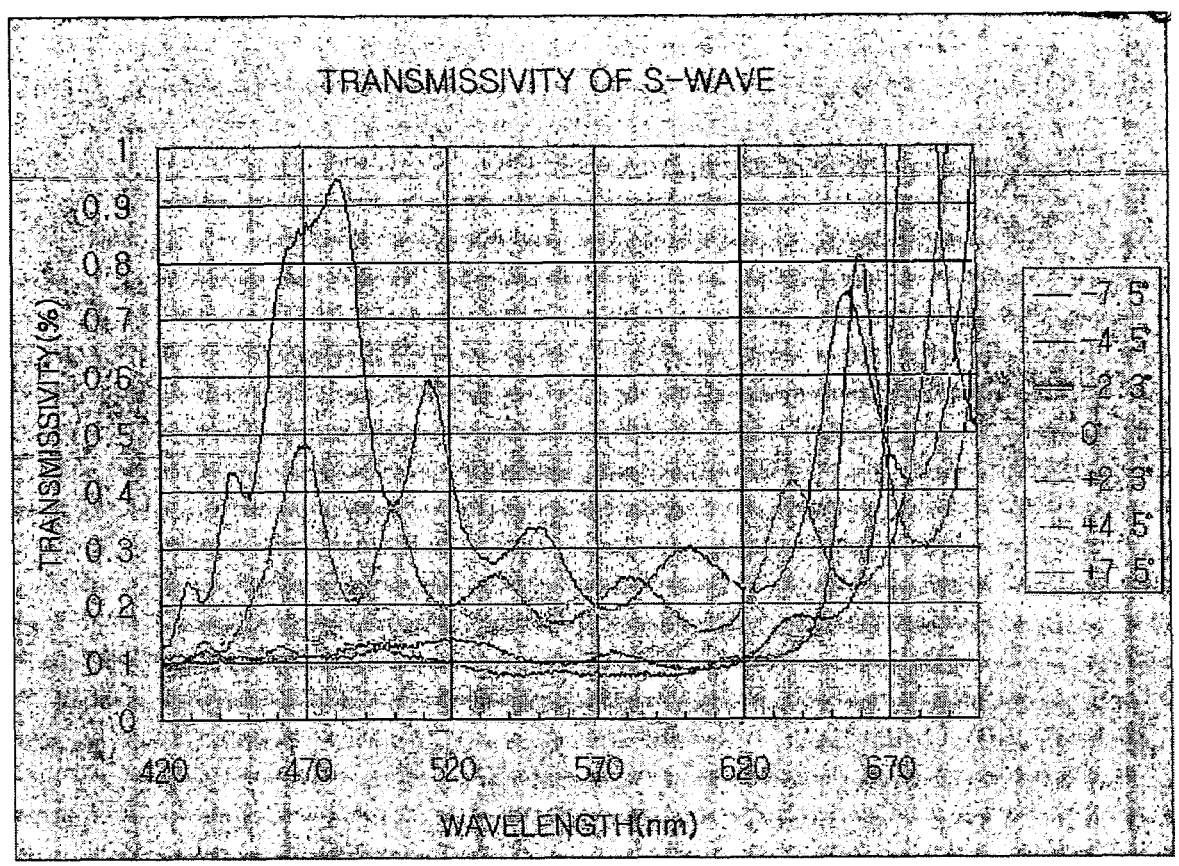
FIGS. 6a and 6b are graphs respectively showing transmissivities of S-wave and P-wave in response to a variation in the refractive angle $\beta$ of a light beam in the polarization beam splitter according to the present invention.
Figure 6B:
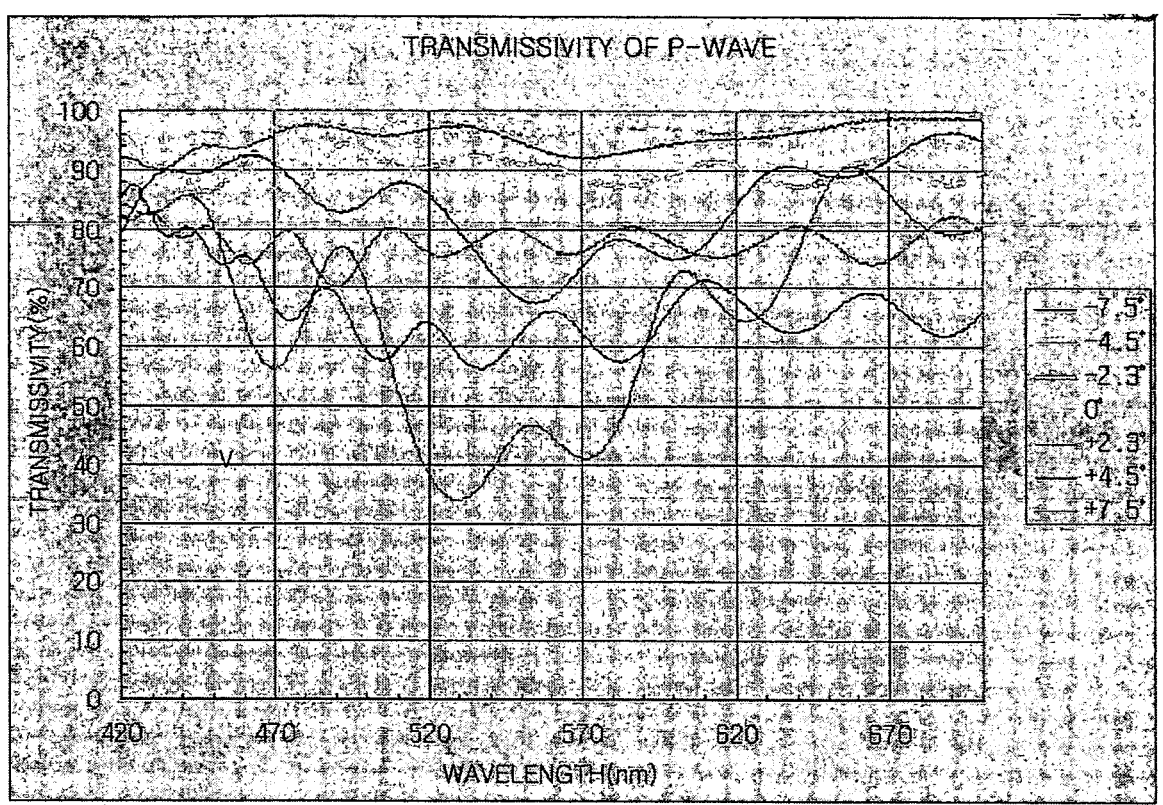

FIGS. 6a and 6b are graphs respectively showing transmissivities of the S-wave and P-wave in response to a variation in the refractive angle β of the light beam refracted inside the polarization beam splitter according to the present invention. FIG. 6a shows the relationship between wavelength and transmissivity of the S-wave at the inclined face inside the polarization beam splitter in response to the refractive angle β of the light beam and FIG. 6b shows the relationship between wavelength and transmissivity of the P-wave at the inclined face of the polarization beam splitter in response to the refractive angle β of the light beam. It can be known from FIG. 6a that the transmissivity of the S-wave decreases as the refractive angle β decreases when the refractive angle is varied within the range of ±7.5°. Furthermore, it can be known from FIG. 6b that the transmissivity of the P-wave increases as the absolute value of the refractive angle β decreases. That is, the transmissivity of the S-wave decreases but the transmissivity of the P-wave increases as the refractive angle β decreases to result in improvement of the performance of the polarization beam splitter.

Table 1 represents the refractive angle β of the light beam in response to the refractive index n of the polarization beam splitter when the f-number of the illumination lens is 2.4, that is, when the incident angle α of the light beam is 12°.

TABLE 1

| Refractive index n | Refractive angle β(°) |
|---|---|
| 1.5 | 8.0 |
| 1.6 | 7.5 |
| 1.7 | 7.0 |
| 1.8 | 6.6 |
| 1.9 | 6.3 |
| 2.0 | 6.0 |

As shown in Table 1, the refractive angle β of the light beam becomes less than 7.5 when the refractive index n of the polarization beam splitter exceeds 1.6 in the case that the f-number of the illumination lens is 2.4, that is, when the incident angle α of the light beam is 12°. That is, the performance of the polarization beam splitter can be improved by decreasing the transmissivity of the S-wave of the light beam but increasing the transmissivity of the P-wave, as shown in FIGS. 6a and 6b, when the refractive index n of the polarization beam splitter is in the range of 1.6 to 2.0. Accordingly, the quantity of P-wave input to the liquid crystal display from the improved polarization beam splitter is increased even when the f-number is decreased in order to improve optical efficiency with a small-size liquid crystal display panel. This can improve the contrast of the reflection-type micro display projection system and reduce the manufacturing cost thereof.

According to another embodiment of the present invention, the integrator can be one of a fly eye lens, a rod lens and a tunel, which modulates the light beam input from the light source such that the light beam has a uniform spatial distribution and outputs the light beam to the color wheel filter.

Furthermore, while the liquid crystal display panel is divided into a single-panel type and a three-panel type, the present invention uses the single-panel type. However, it is also possible to construct the reflection-type micro display projection system using the three-panel type liquid crystal display panel.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A reflection-type micro display projection system comprising:
    a light source for emitting a light beam;
    an optical system for transmitting the light beam emitted from the light source;
    a reflection-type liquid crystal display panel for reflecting the light beam transmitted through the optical system and outputting the light beam as image information;
    a projection lens for magnifying and projecting the image information; and
    a screen for displaying an image corresponding to the image information magnified and projected by the projection lens,
    wherein $n \times \sin \beta = \sin \alpha$ when the incident angle of the light beam, which is output from an illumination lens of the optical system and input to a polarization beam splitter on the basis of the normal of the boundary face of the polarization beam splitter, is α, the refractive angle of the light beam refracted inside the polarization beam splitter is β, and the refractive index of the polarization beam splitter is n, the refractive index n being larger than 1.6 and smaller than 2.0, wherein the refractive angle β of the light beam refracted inside the polarization beam splitter is smaller than 7.5°.

2. The reflection-type micro display projection system as claimed in claim 1, wherein the optical system comprises:
   an integrator for changing the light beam such that the light beam has a uniform spatial distribution;
   a color filter for dividing the light beam output from the integrator into time-sequential red, green and blue beams;
   first and second illumination lenses for illuminating the divided beams to the liquid crystal display panel; and
   the polarization beam splitter for polarizing the beams derived from the first and second illumination lenses.

3. The reflection-type micro display projection system as claimed in claim 2, wherein the integrator includes at least one of a fly eye lens, a rod lens and a tunnel.

4. The reflection-type micro display projection system as claimed in claim 1, wherein, when the polarization beam splitter polarizes the light beam derived from the illumination lens, which has the property of wave, into an S-wave and a P-wave, at least one of the S-wave and P-wave is input to the liquid crystal display panel.

5. The reflection-type micro display projection system as claimed in claim 1, wherein the liquid crystal display panel is a single-panel type or a three-panel type.

* * * * *